United States Patent
Jefferies et al.

(10) Patent No.: US 9,573,478 B2
(45) Date of Patent: Feb. 21, 2017

(54) EVSE DOUBLER ADD-ON UNIT

(71) Applicant: SCHNEIDER ELECTRIC USA, INC., Palatine, IL (US)

(72) Inventors: Kevin M. Jefferies, Raleigh, NC (US); Benjamin W. Edwards, Rolesville, NC (US); Matthew L. White, Raleigh, NC (US); Konstantin A. Filippenko, Raleigh, NC (US); Richard K. Weiler, Raleigh, NC (US)

(73) Assignee: Schneider Electric USA, Inc., Andover, MA (US)

( * ) Notice: Subject to any disclaimer, the term of this patent is extended or adjusted under 35 U.S.C. 154(b) by 66 days.

(21) Appl. No.: 14/541,546

(22) Filed: Nov. 14, 2014

(65) Prior Publication Data
US 2016/0137082 A1 May 19, 2016

(51) Int. Cl.
*H02J 7/00* (2006.01)
*B60L 11/18* (2006.01)

(52) U.S. Cl.
CPC ........ *B60L 11/1818* (2013.01); *B60L 11/1816* (2013.01); *B60L 11/1838* (2013.01); *B60L 11/1844* (2013.01); *H02J 7/0052* (2013.01); *B60L 2230/12* (2013.01)

(58) Field of Classification Search
CPC ...................................... H02J 7/042
USPC ...... 320/109, 107, 126, 104; 307/11, 18, 19, 307/31, 32, 38; 180/65.1, 65.21, 65.29
See application file for complete search history.

(56) References Cited

U.S. PATENT DOCUMENTS

| | | |
|---|---|---|
| 2,991,397 A | 6/1961 | Place |
| 3,947,759 A | 3/1976 | Briggs |
| 5,504,414 A * | 4/1996 | Kinoshita ................. B60L 7/14 180/65.8 |

(Continued)

FOREIGN PATENT DOCUMENTS

| | | |
|---|---|---|
| CN | 1031047512 | 5/2013 |
| DE | 10 2009 034886 | 2/2011 |

(Continued)

OTHER PUBLICATIONS

ChargePoint Charging Station—Press Release Jul. 18, 2013.
(Continued)

*Primary Examiner* — Richard V Muralidar
(74) *Attorney, Agent, or Firm* — Locke Lord LLP (57) ABSTRACT

An add-on adapter 110 enables a single charging port 102 of an electric vehicle charging station 100 to simultaneously charge two electric vehicles. An adapter controller 120 determines the available charging rate offered by the charging station. Electric vehicle charging handles 150A, 150B are determined to be connected to the electric vehicles. A charge sharing control circuit 300 in the adapter controller, determines modified available charging rates to be offered for simultaneously charging the electric vehicles. The modified available charging rates are based on the connection states of the electric vehicles and the available charging rate offered by the charging station. The adapter controller controls two contactors 130A, 130B to switchably connect a charging station power socket to the electric vehicle charging handles, to provide shared power at the determined modified available charging rate to the electric vehicles, for simultaneous charging.

9 Claims, 8 Drawing Sheets

(56) References Cited

U.S. PATENT DOCUMENTS

| | | | |
|---|---|---|---|
| 5,548,200 A * | 8/1996 | Nor | B60L 11/184 320/106 |
| 6,510,793 B1 | 1/2003 | Kerr et al. | |
| 8,013,570 B2 | 9/2011 | Baxter | |
| 8,106,627 B1 | 1/2012 | Rossi | |
| 8,294,415 B2 | 10/2012 | Fujitake | |
| 8,368,349 B2 * | 2/2013 | Zyren | G06Q 50/06 307/DIG. 1 |
| 8,558,504 B2 | 10/2013 | Brown et al. | |
| 8,643,330 B2 * | 2/2014 | Nergaard | B60L 1/003 320/109 |
| 8,698,346 B2 | 4/2014 | Kamaga | |
| 9,093,724 B2 | 7/2015 | Fujitake | |
| 9,148,027 B2 * | 9/2015 | Shane | H02J 3/14 |
| 9,233,611 B2 | 1/2016 | Klesyk | |
| 2008/0103552 A1 | 5/2008 | Goetz et al. | |
| 2009/0167537 A1 | 7/2009 | Feliss et al. | |
| 2009/0316321 A1 | 12/2009 | Ouwerkerk | |
| 2011/0010043 A1 | 1/2011 | Lafky | |
| 2011/0144823 A1 | 6/2011 | Muller et al. | |
| 2011/0169447 A1 | 7/2011 | Brown et al. | |
| 2011/0172839 A1 | 7/2011 | Brown | |
| 2012/0032636 A1 | 2/2012 | Bianco | |
| 2012/0098490 A1 | 4/2012 | Masuda | |
| 2012/0119702 A1 | 5/2012 | Gaul et al. | |
| 2012/0229089 A1 | 9/2012 | Bemmel et al. | |
| 2012/0245880 A1 | 9/2012 | Nabrotzky | |
| 2012/0249070 A1 | 10/2012 | Sellner et al. | |
| 2012/0277927 A1 | 11/2012 | Watkins et al. | |
| 2012/0287542 A1 | 11/2012 | Bianco | |
| 2013/0217409 A1 | 8/2013 | Bridges et al. | |
| 2013/0322017 A1 | 12/2013 | Muller et al. | |
| 2014/0015487 A1 | 1/2014 | Brown et al. | |
| 2014/0035527 A1 | 2/2014 | Hayashigawa et al. | |
| 2014/0049213 A1 | 2/2014 | Bianco | |
| 2014/0049218 A1 | 2/2014 | Morand et al. | |
| 2014/0179164 A1 | 6/2014 | Kanamori et al. | |
| 2014/0203777 A1 | 7/2014 | Flack | |
| 2014/0232182 A1 | 8/2014 | Kinomura et al. | |
| 2015/0303737 A1 | 10/2015 | Steinbuchel et al. | |

FOREIGN PATENT DOCUMENTS

| | | |
|---|---|---|
| EP | 2190102 | 5/2010 |
| EP | 2332771 | 6/2011 |
| EP | 2432094 | 3/2012 |
| EP | 2581256 | 4/2013 |
| EP | 2800222 | 11/2014 |
| JP | 2013027144 | 2/2013 |
| WO | WO 2012129104 | 9/2012 |
| WO | WO2013124841 | 8/2013 |
| WO | WO 20140036013 | 3/2014 |
| WO | WO 2014155947 | 10/2014 |

OTHER PUBLICATIONS

Vitor Monteiro, et al, "Comparison of Charging Systems for Electronic Vehicles and Their Impact on Electrical Grid", Annual Seminar on Automation, Industrial Electronics and Instrumentation 2012—SAEEI'12, pp. 440-445, Guimaraes, Portugal, Jul. 2012, ISBN: 978-972-98603-5-5.

(R) SAE Electric Vehicle Conductive Charge Coupler, SAE J1772, Revised Aug. 2001, Prepared by the SAE EV Charging Systems Committee.

Nick Sayer: "Google Code Archive—Long-term storage for Google Code Project Hosting.", Mar. 2, 2014 (Mar. 2, 2014), XP055260798, Retrieved from the Internet: URL:http://code.google.com/archive/p/open-evse/wikis/Hydra.wiki.

Bitblt; "SF BayLEAFs meeting: Feb. 2014", Youtube, Feb. 18, 2014 (Feb. 18, 2014), pp. 1-1, XP054976443, Retrieved from the Internet: URL:https://www.youtube.com/watch?v=RW9G Em2iqr4.

Extended European Search Report for Application No. 15193312. 4-1807 dated May 4, 2016.

SAE J1772TM JAN2010, SAE Electrical Vehicle and Plug in Hybrid Electric Vehicle Conductive Charge Coupler: published 2010.

* cited by examiner

EVSE DOUBLER ADD-ON UNIT

BACKGROUND OF THE INVENTION

1. Field of the Invention

The invention disclosed relates to electric vehicle supply equipment.

2. Discussion of the Related Art

Plug-in electric vehicles (EVs), including all-electric cars, neighborhood electric vehicles and plug-in hybrids, are becoming a popular mode for personal transportation, in part because they are less expensive to operate and have a reduced carbon footprint. To support the increased number of EVs, more charging stations with more charging capacity must be made available. A typical commercial or residential electric vehicle charging station, also called an Electric Vehicle Supply Equipment (EVSE), has a single charging port to which may be connected a charging cable. The charging cable has a charging handle at its other end, whose connectors are inserted into a vehicle inlet for delivering electric power from the premises wiring to the electric vehicle. Only a single electric vehicle may be connected at a time to the charging port of the typical EVSE. The EVSE charging capacity is limited by circuit breakers and branch circuits of the installed infrastructure upstream of the EVSE, as well as the capacity rating of the EVSE itself.

A system is needed to allow increasing the number of available charging ports of an EVSE installation, without requiring an increased system capacity, and without requiring modification of the installed infrastructure upstream of the EVSE, such as rewiring the user's residence. Attempts have been made in the past to address this need by providing an EVSE add-on adapter with multiple charging ports that are sequentially powered. However, such a solution imposes a wait time for those EVs that are not first in line to be charged. Other attempts have required separate branch circuits to power each charging port of a multi-port EVSE.

SUMMARY OF THE INVENTION

The subject invention provides an efficient solution to this need by creating an EVSE add-on adapter that plugs into a single charging port and provides two charging cables to double the number of EVs that may be simultaneously charged in a power sharing mode. No rewiring of the premises is required.

When the add-on adapter is initially plugged into the charging port of a typical EVSE, or after a short delay, the add-on adapter connects a circuit that lowers the impedance between the control pilot signal line and ground for a positive voltage on the control pilot signal. The add-on adapter thereby simulates the interaction between an EVSE and EV. The EVSE responds by signaling to the add-on adapter over the control pilot signal line, to indicate the maximum available current that the EVSE is capable of providing to the add-on adapter. The circuit connected by the add-on adapter between control pilot and ground, results in a control pilot signal voltage that is detected by the EVSE and causes the EVSE to close its contactor and connect the add-on adapter to the line voltages. The add-on adapter stores the value of the maximum available current, as provided by the EVSE on the control pilot signal, which will be shared if there is more than one EV that needs to be charged.

When a user plugs a charging handle of one of the add-on adapter's two charging cables into an EV's charging inlet, the EV closes the circuit between the control pilot signal line and the ground line, with a specific impedance. Closing the circuit between a control pilot signal line and ground with this impedance, indicates that an EV is connected, but is not ready to accept energy. When only one EV is connected at any given time to the add-on adapter, the add-on adapter is able to offer to that EV the maximum available current that the EVSE will deliver to the add-on adapter (or the maximum current as limited by the capacity of the adapter design, whichever is less). The add-on adapter then signals to the EV, using the control pilot signal line, the amount of available charging current. The EV then responds by closing the circuit between the control pilot signal line and the ground line with a different specific impedance, indicating that the EV is ready to accept energy. The add-on adapter then closes a contactor or relay associated with the handle connected to the EV, allowing the EV to begin charging.

With one EV connected to the adapter and charging, when a user plugs the charging handle of the second cable of the add-on adapter into a second EV's charging inlet, the second EV closes the circuit between the second control pilot signal line and the second ground line, with a specific impedance. Closing the circuit between the second control pilot signal line and ground with this impedance indicates that a second EV is connected, but is not ready to accept energy. When there are two EVs simultaneously connected to the add-on adapter and requesting charge, the add-on adapter must determine a modified available charging rate to be offered to both the first and the second EVs, since they must share the available capacity determined by the limit of the upstream EVSE or the add-on adapter.

The add-on adapter includes a charge sharing control circuit that is configured to dynamically determine modified available charging rates to be offered for simultaneously charging two EVs. For example, the charge sharing control circuit in the add-on adapter may dynamically determine that the modified available charging rates to be offered to two respective EVs is half of the available charging rate offered by the upstream EVSE. In this case, the add-on adapter would offer to each EV, over its respective control pilot signal line, a modified available charging rate equal to half of the charging rate offered by the upstream EVSE.

After the add-on adapter establishes the modified available charging rates and corresponding control pilot signals, each EV may then respond by closing the circuit between the respective control pilot signal line and ground line with a specific impedance indicating that the EV is ready to accept energy and is requesting charge.

After each EV requests charge the add-on adapter closes the contactor or relay associated with handle connected to the respective EV, allowing the EV to begin charging. The EV then draws current to charge at the modified charging rate offered by the add-on adapter. For example, with two EVs connected to the adapter and charging, both EVs could charge at a rate equal to half of the charge rate offered by the upstream EVSE.

In this manner, an increased number of available charging ports are provided for an EVSE, without requiring an increased system capacity, without requiring modification of the installed infrastructure upstream of the EVSE, and without imposing a wait time for those EVs that are not first in line to be charged. In summary, the distribution of the available charging capacity provided by the upstream EVSE may, at any given moment in time, be allocated amongst a plurality of EVs connected to the multiple downstream charging ports of the add-on adapter. This allocation of upstream charging capacity to downstream charging EVs can be done dynamically, with the allocation determined by the add-on adapter based on multiple variables, including the number of EVs connected and requesting charge, the charging capacity offered by the upstream EVSE, the instantaneous charging rate utilization for each of the connected EVs, the total charging session duration for a particular EV, the total charging session power consumption for a particular EV, or other prioritization associated with a particular EV or user.

DETAILED DESCRIPTION OF EMBODIMENTS OF THE INVENTION

An add-on adapter is disclosed for an Electric Vehicle Supply Equipment (EVSE), alternatively called an electric vehicle charging station, to double the number of available charging handles. The add-on adapter plugs into a standard charging port of an EVSE and provides two charging cables with respective charging handles, which simultaneously charge two electric vehicles (EVs) in a power sharing mode. The add-on adaptor determines modified available charging rates to be respectively offered to two EVs. The charging rate offers may be dynamically changed by the add-on adapter as EVs are added or removed for charging. The add-on adapter switchably connects the charging port of the EVSE to the charging handles, to provide the shared power at the determined modified available charging rates to the respective EVs for simultaneous charging.

Figure 1:
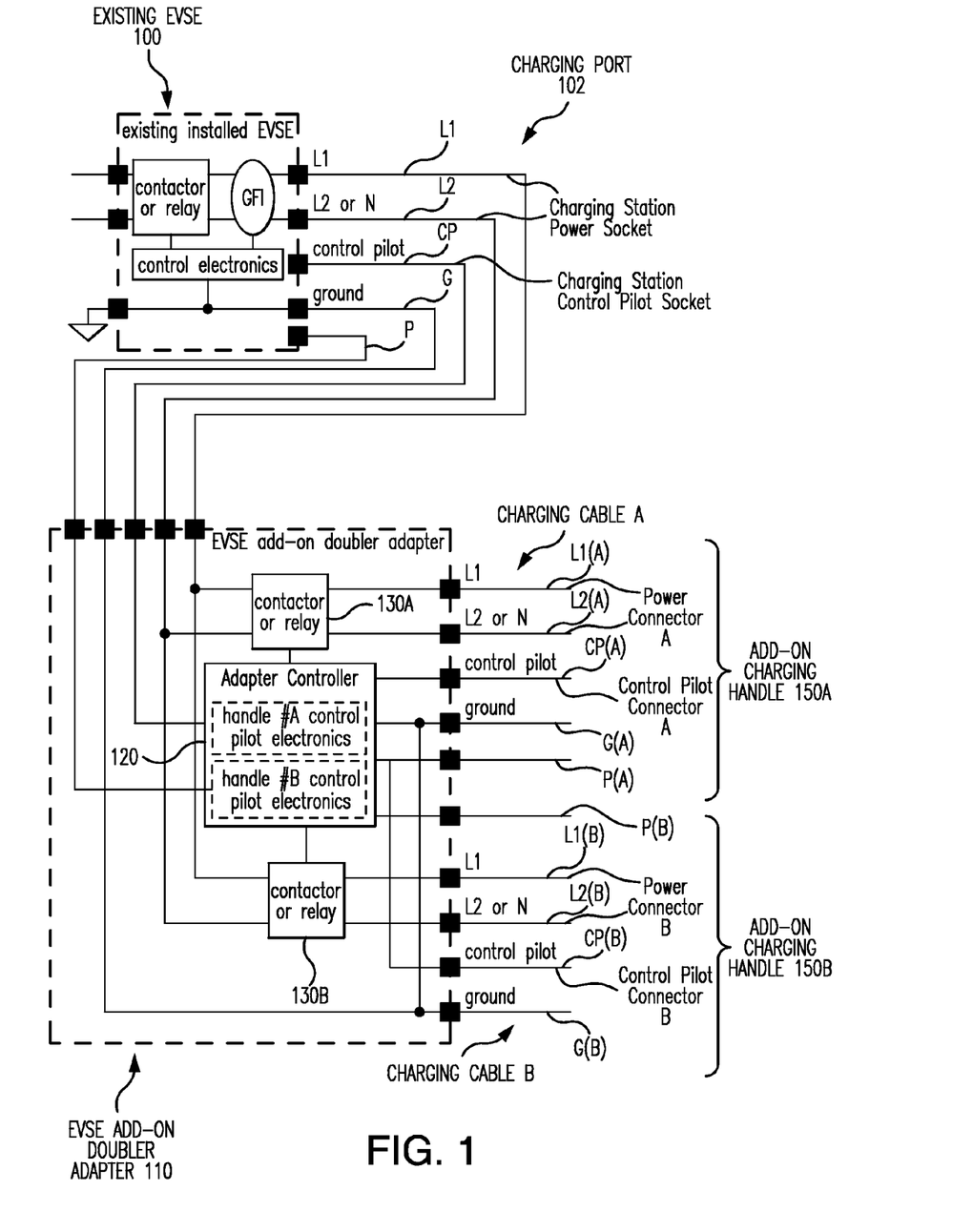
FIG. 1 is a functional block diagram of an example add-on adapter connected to a single charging port of an electric vehicle charging station, electrically connected to two electric vehicle charging handles, for sharing power by simultaneously charging two respective electric vehicles.

FIG. 1 is a functional block diagram of an example add-on adapter 110 connected to a single charging station power socket or charging port 102 of an EVSE 100. The add-on adapter 110 is electrically connected to charging cables A and B that terminate in two charging handles 150A and 150B, for sharing power by simultaneously charging two respective EVs. The charging port or socket 102 of the EVSE 100 may be a standard SAE J1772 socket providing 208 to 240 volt AC, single phase power for a maximum continuous current of 30 Amperes. The standard SAE J1772 handle includes two power terminals L1 and L2 or N (neutral), a control pilot socket terminal CP, and a ground socket terminal G. The "L2 or N" designation will be abbreviated herein as "L2", with the understanding the L2 terminal may also be a neutral "N" terminal. The handle may also include a proximity detection line P that is used to monitor the insertion of the handle into the EV receptacle and state of an associated handle proximity button. The proximity detection line P may be used by the add-on adapter to abort charging sessions if someone unplugs the add-on adapter while it's charging. Proximity detection may also provide a signal to activate the EV onboard charge controller and engage the EV drive interlock system to prevent the EV from driving off while charging. The add-on adapter 110 may be powered by the two power terminals L1 and L2 or N provided by the upstream EVSE 100, which may avoid having to provide a separate power source.

The example add-on adapter 110 has L1 and L2 power input lines that connect the incoming power from the power socket terminals L1 and L2 of the charging port 102, to two branches that respectively connect to input sides of two example contactors or relays 130A and 130B. An output side of the first contactor or relay 130A switchably connects the charging station power socket terminals L1 and L2 to respective output power lines L1(A) and L2(A) of a first charging cable A that terminates in a first add-on charging handle 150A. An output side of the second contactor or relay 130B switchably connects the charging station power socket terminals L1 and L2 to respective output power lines L1(B) and L2(B) of a second charging cable B that terminates in a second add-on charging handle 150B. The add-on adapter 110 has the G ground input line from the ground socket terminal G of the charging port 102, passing directly to output ground lines G(A) and G(B) of the first and second charging cables A and B.

The example add-on adapter 110 includes an example adapter controller 120 that electrically connects to the control pilot socket CP of the charging port 102 of the EVSE 100. The adapter controller 100 further electrically connects to two electric vehicle control pilot connectors CP(A) and CP(B) of the two respective electric vehicle charging handles 150A and 150B. The SAE J1772 standard specifies that the control pilot functions to verify that the vehicle is present and connected, permits energization/de-energization of the supply, transmits supply equipment current rating to the vehicle, monitors the presence of the equipment ground, and establishes vehicle ventilation requirements. The example adapter controller 120 includes control pilot electronics for both charging handles 150A and 150B, which is further described with respect to FIG. 2.

Figure 2:
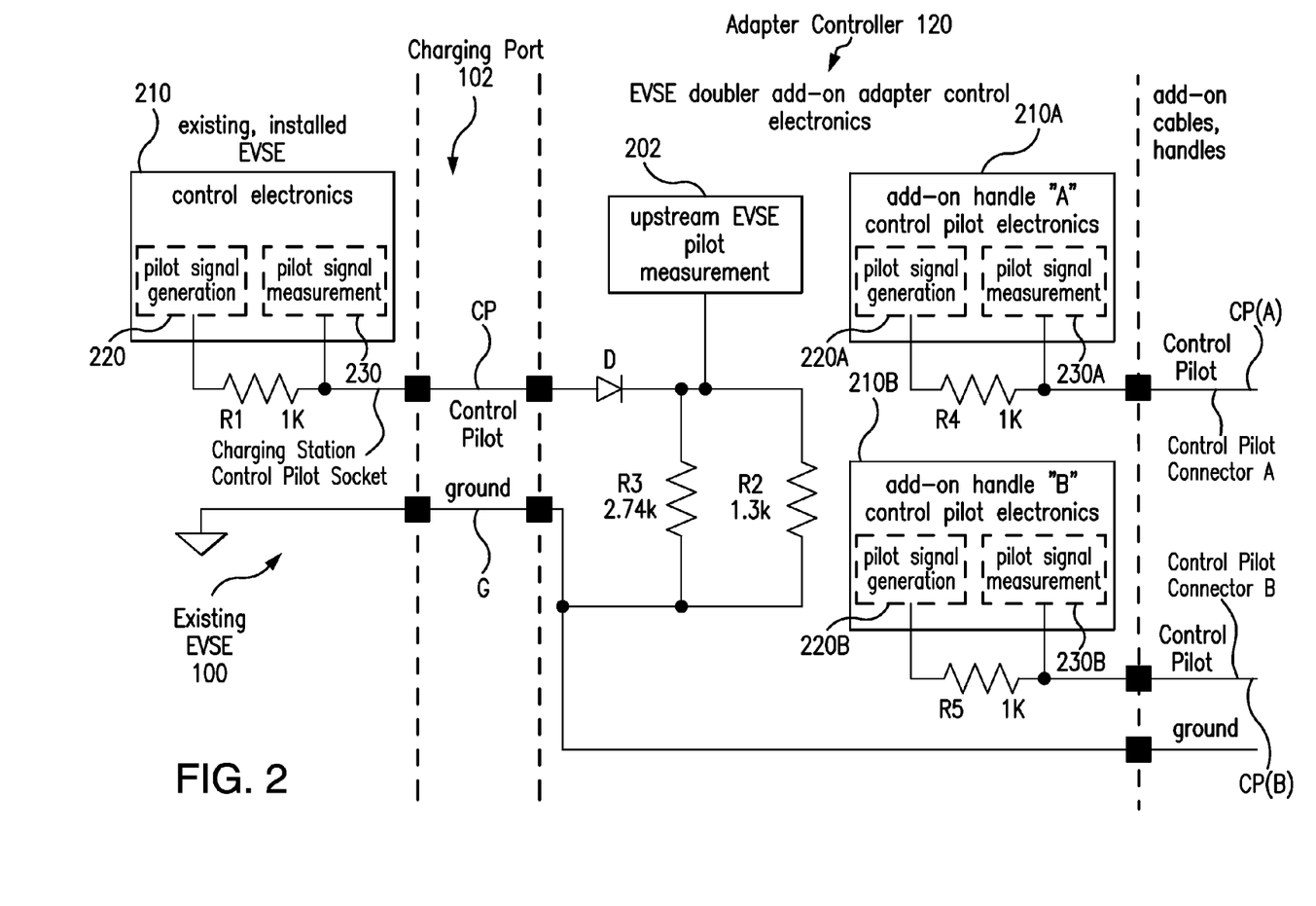
FIG. 2 is a more detailed functional block diagram of an example adapter controller in the add-on adapter of FIG. 1, including an upstream pilot measurement circuit, two pilot signal measurement circuits, and two pilot signal generation circuits.
Figure 7:
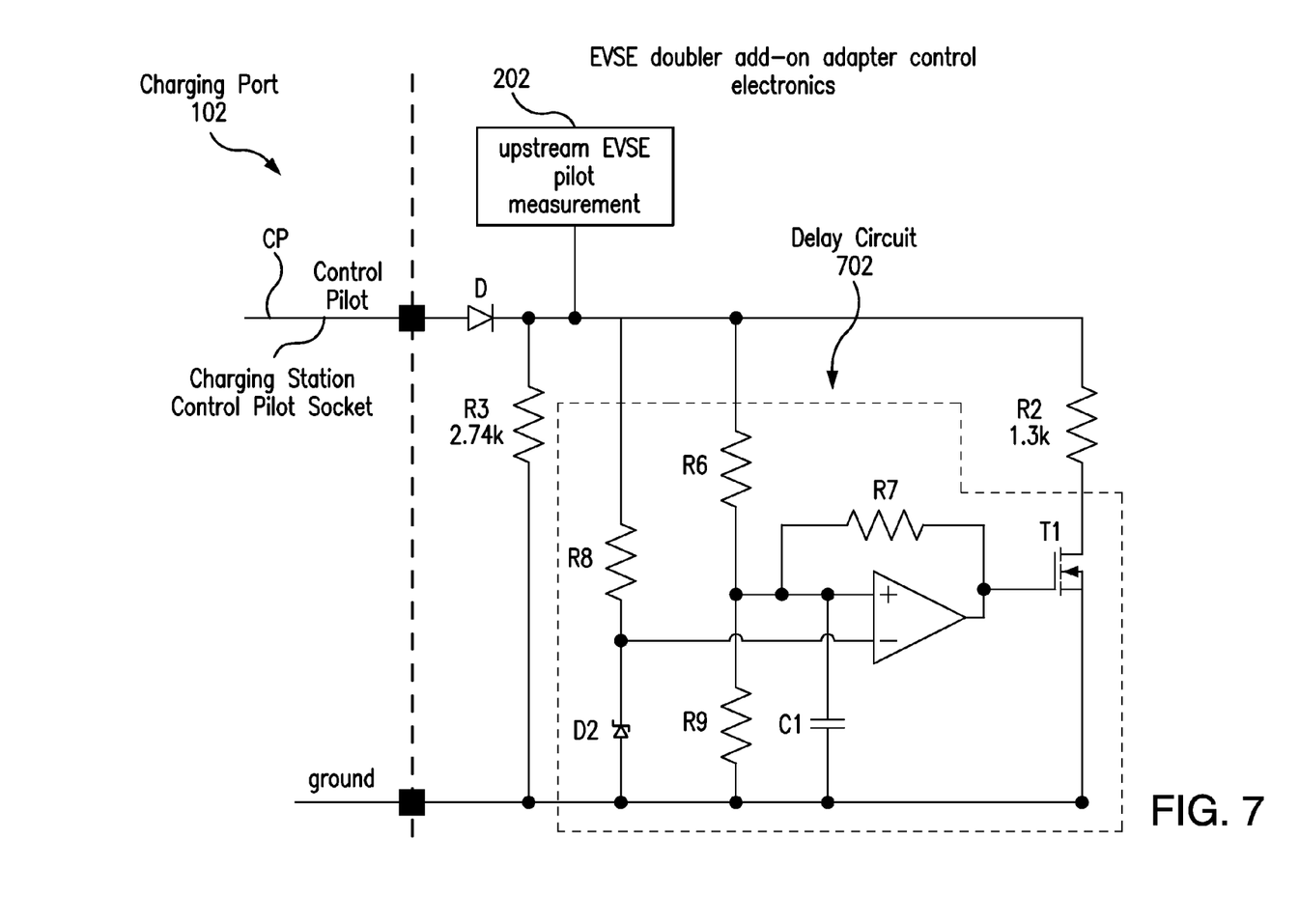
FIG. 7 is a circuit diagram of the example adapter controller of FIG. 2, including a delay circuit configured to delay requesting power from the charging station when the adapter is initially connected to the charging station.

FIG. 2 is a more detailed functional block diagram of the example adapter controller 120 in the add-on adapter 102 of FIG. 1. When the add-on adapter 102 is initially plugged into the EVSE charging port 102, the add-on adapter 102 signals the EVSE over the control pilot signal line CP, to close its contactor and provide power to the add-on adapter 102. The control pilot signal specified in the SAE J1772 standard is a DC steady state voltage or 1 kHz square wave signal in the range of +12 and −12 volts. The EVSE produces the control pilot signal to establish the state of the charging transaction with the EV. If the control pilot signal voltage is a steady +12 volts DC, this indicates State A, that an EV is not connected. If the control pilot signal is a 1 kHz square wave signal with a positive voltage of +9 volts and a negative voltage of −12 volts, this indicates State B, that an EV is connected, but is not ready to receive a charge. If the control pilot signal is a 1 kHz square wave signal with a positive voltage of +6 volts and a negative voltage of −12 volts, this indicates State C, that the EV is ready to accept the charge and does not require indoor charging area ventilation. In the nominal interaction sequence described in J1772 between an EVSE and EV, the transition from state B to state C occurs when the EV closes a switch to connect a circuit that lowers the impedance between control pilot signal line and ground during the positive portion of the control pilot square wave signal. This impedance causes the voltage during the positive portion of the control pilot square wave signal to lower to the nominal state C voltage of +6 volts. The add-on adapter 120 achieves the same transition from state B to state C that would normally occur with an EV connecting directly to the EVSE. The add-on adapter 120 connects impedance between control pilot and ground as specified in J1772 for an EV to enter state C, thus causing the EVSE to close its contactor and provide power to the add-on adapter 120. The example adapter controller 120 performs this signaling by using the resistors R2 and R3 and the diode D, to cause the pilot signal measurement 230 of the upstream EVSE 100 to measure a positive voltage of +6 volts and a negative voltage of −12 volts on the control pilot signal line CP, thereby simulating State C to the EVSE, that a charging handle is connected and an EV is ready to receive a charge. As a result, when the add-on adapter 120 is initially plugged into the EVSE, the EVSE then responds by delivering power on L1 and L2 to the input sides of the open contactors 130A and 130B. In an alternate embodiment, the adapter controller 120 may include a delay circuit configured to delay the add-on adapter requesting power from the EVSE when the add-on adapter is initially connected to the EVSE, as is illustrated in FIG. 7.

When the add-on adapter 110 is initially plugged into the charging port 102 of a typical EVSE 100, or after a short delay, the add-on adapter connects a circuit which lowers the impedance between control pilot signal line CP and ground for a positive voltage on the control pilot signal. The add-on adapter thereby simulates the interaction between an EVSE and EV, and achieves the same transition from state B to state C that would normally occur with an EV connecting directly to the EVSE. The EVSE 100 responds by signaling to the add-on adapter 110 over the control pilot signal line CP, setting the control pilot signal to a pulse width modulation (PWM) representing the maximum available current that the EVSE 100 is capable of providing to the add-on adapter 110. The circuit connected by the add-on adapter between control pilot signal line CP and ground results in a control pilot signal voltage that is detected by the EVSE 100 and causes the EVSE to close its contactor and connect the add-on adapter 110 to the line voltages. The add-on adapter 110 stores the value of the maximum available current, as provided by the EVSE on the control pilot signal line CP, which will be shared if there is more than one EV that needs to be charged.

The example adapter controller 120 includes an example upstream pilot measurement circuit 202, coupled through the diode D to the charging station control pilot socket CP. The upstream pilot measurement circuit 202 receives an indication via the charging station control pilot socket CP, representing an available charging rate offered by the EVSE.

The control pilot signal specified in the SAE J1772 standard, has a duty cycle or ratio of the high state to the low state of the square wave, which is set by the EVSE as the maximum available current on the EVSE power socket terminals L1 and L2. The EVSE sets the duty cycle of the control pilot signal, which represents the offered charging rate. Where an EV is directly connected by its charging cable to the EVSE charging port 102, the offered charging rate is made to the EV and the EV must comply with the original setting or with changes required by the EVSE to the duty cycle. However, since the add-on adapter 110 is connected to the EVSE charging port 102, the offered charging rate is received by the upstream pilot measurement circuit 202, and the add-on adapter 110 must determine how to share between two EVs, the charging rate offered by the EVSE. Example duty cycles and offered charging rates specified in SAE J1772, are shown in Table 1:

TABLE 1

| Amperes | Duty Cycle |
|---------|------------|
| 6 A     | 10%        |
| 12 A    | 20%        |
| 18 A    | 30%        |
| 24 A    | 40%        |
| 30 A    | 50%        |

When an EV connects to one of the two electric vehicle charging handles, for example charging handle 150A, of the EVSE, the EV connects an impedance which causes the control pilot signal line CP(A) between the EV and the add-on adapter 120 to enter into State B, indicating that the EV is connected, but is not ready to accept energy. The example adapter controller 120 in the add-on adapter 102, learns of the presence of EVs connected to its charging handles 150A and/or 150B, by means of two pilot signal measurement circuits 230A and 230B in the adapter controller 120. The two pilot signal measurement circuits 230A and 230B are each connected to the respective electric vehicle control pilot connector CP(A) or CP(B) from the respective charging handles 150A and 150B. The two pilot signal measurement circuits 230A and 230B receive a respective indication via the respective electric vehicle control pilot connector CP(A) or CP(B) representing a connection state of the respective electric vehicle charging handle 150A and 150B, as whether or not being connected to the respective EV.

If this is the first EV connecting to the EVSE, then the add-on adapter 120 is able to offer to the EV, the maximum available current that the EVSE has indicated that it will deliver to the add-on adapter 120, or the maximum the add-on adapter is able to conduct, which could be less. The example adapter controller 120 includes a charge sharing control circuit 300 shown in FIG. 3, which is coupled to the two pilot signal measurement circuits 230A and 230B and to the upstream pilot measurement circuit 202. The charge sharing control circuit 300 determines modified available charging rates to be offered for simultaneously charging the respective EVs, based on the connection states of the respective EVs and the available charging rate offered by the EVSE. For example, if this is the first EV connecting to the EVSE, then the charge sharing control circuit 300 determines to offer to the EV, the maximum available current that the EVSE has indicated it will deliver to the add-on adapter 120.

The add-on adapter 120 then signals to the EV over the control pilot signal line CP(A) between the EV and the add-on adapter 120, indicating the amount of the maximum available current. The adapter controller 120 includes two pilot signal generation circuits 220A and 220B, each coupled to the respective electric vehicle control pilot connector CP(A) and CP(B) and to the charge sharing control circuit 300. The pilot signal generation circuits 220A and 220B transmit respective charging rate offer indications via the respective electric vehicle control pilot connector CP(A) and CP(B), representing the determined modified available charging rates to be offered to the respective EVs for simultaneous charging.

For example, if the EVSE has a maximum available current of 24 Amperes, it would set the duty cycle of the control pilot signal at 40%, which is received by the upstream pilot measurement circuit 202 and reported to the charge sharing control circuit 300. The charge sharing control circuit 300 has received indications from the pilot signal measurement circuits 230A and 230B that there is one EV connected to handle 150A and no EV connected to handle 150B. The charge sharing control circuit 300 may then determine that the modified available charging rate to be offered to the sole EV is the full available charging rate of 24 Amperes offered by the EVSE. Thus, the charge sharing control circuit 300 causes the pilot signal generation circuit 220A to transmit a charging rate offer indication of 24 Amperes, by setting the duty cycle of the control pilot signal at 40% on the electric vehicle control pilot connectors CP(A).

The EV then responds by issuing a State C signal over a control pilot signal line CP(A) between the EV and the add-on adapter 120, indicating that the EV is ready to accept energy. The add-on adapter 120 then proceeds to provide a connection to the two power terminals L1 and L2 or N (neutral). The contactor 130A receives a switching signal on a switch control input from the adapter controller 120, to switchably connect the charging station power sockets L1 and L2 to the electric vehicle charging handle 150A, in response to the adapter controller 120 indicting that the EV is ready to be charged. The EV on-board charger is required to respect the current limit indicated over the control pilot signal line CP. The EV on-board charger limits the power it receives, to be the determined modified available charging rate.

When a second EV connects, thereafter, to the second electric vehicle charging handle 150(B) of the EVSE, the second EV connects an impedance which causes the second control pilot signal line CP(B) between the second EV and the add-on adapter 120 to enter into State B, indicating that the second EV is connected, but is not ready to accept energy. Since this is the second EV connecting to the EVSE, the charge sharing control circuit 300 of the add-on adapter 120 must dynamically determine modified available charging rates to be offered for simultaneously charging both the first and the second EVs, based on the available charging rate originally offered by the EVSE.

For example, if the EVSE has a maximum available current of 24 Amperes, it would set the duty cycle of the control pilot signal CP at 40%, which is received by the upstream pilot measurement circuit 202 and reported to the charge sharing control circuit 300. The charge sharing control circuit 300 has received indications from the pilot signal measurement circuits 230A and 230B that there are two EVs connected. The charge sharing control circuit 300 may dynamically determine that the modified available charging rates to be offered to two respective EVs is half of the available charging rate of 24 Amperes offered by the EVSE. Thus, the charge sharing control circuit 300 causes the pilot signal generation circuits 220A and 220B transmit respective charging rate offer indications of 12 Amperes, by setting the duty cycle of the control pilot signal at 20% on the respective electric vehicle control pilot connectors CP(A) and CP(B). The response from the first EV that is already charging, is to continue charging, but to draw less current equaling the charging rate offer indication of 12 Amperes.

The second EV responds by issuing a State C signal over its respective control pilot signal line CP(B) between the second EV and the add-on adapter 120, indicating that the second EV is ready to accept energy. The add-on adapter 120 then proceeds to provide a connection to the two power terminals L1 and L2 or N (neutral). The contactor 130B receives a switching signal on a switch control input from the adapter controller 120, to switchably connect the charging station power sockets L1 and L2 to the electric vehicle charging handle 150B, in response to the adapter controller 120 indicting that the second EV is ready to be charged. The second EV on-board charger is required to respect the current limit indicated over the control pilot signal line CP(B). The second EV on-board charger limits the power it receives, to be the determined modified available charging rate equaling the charging rate offer indication of 12 Amperes.

The two contactors 130A and 130B receive a switching signal on a switch control input from the adapter controller 120, to switchably connect the charging station power sockets L1 and L2 to the respective electric vehicle charging handles 150A and 150B, in response to the adapter controller 120 indicting that the respective EVs are ready to be charged. The respective EV on-board chargers limit the power they respectively receive, to be the determined modified available charging rate equaling the charging rate offer indication.

Figure 3:
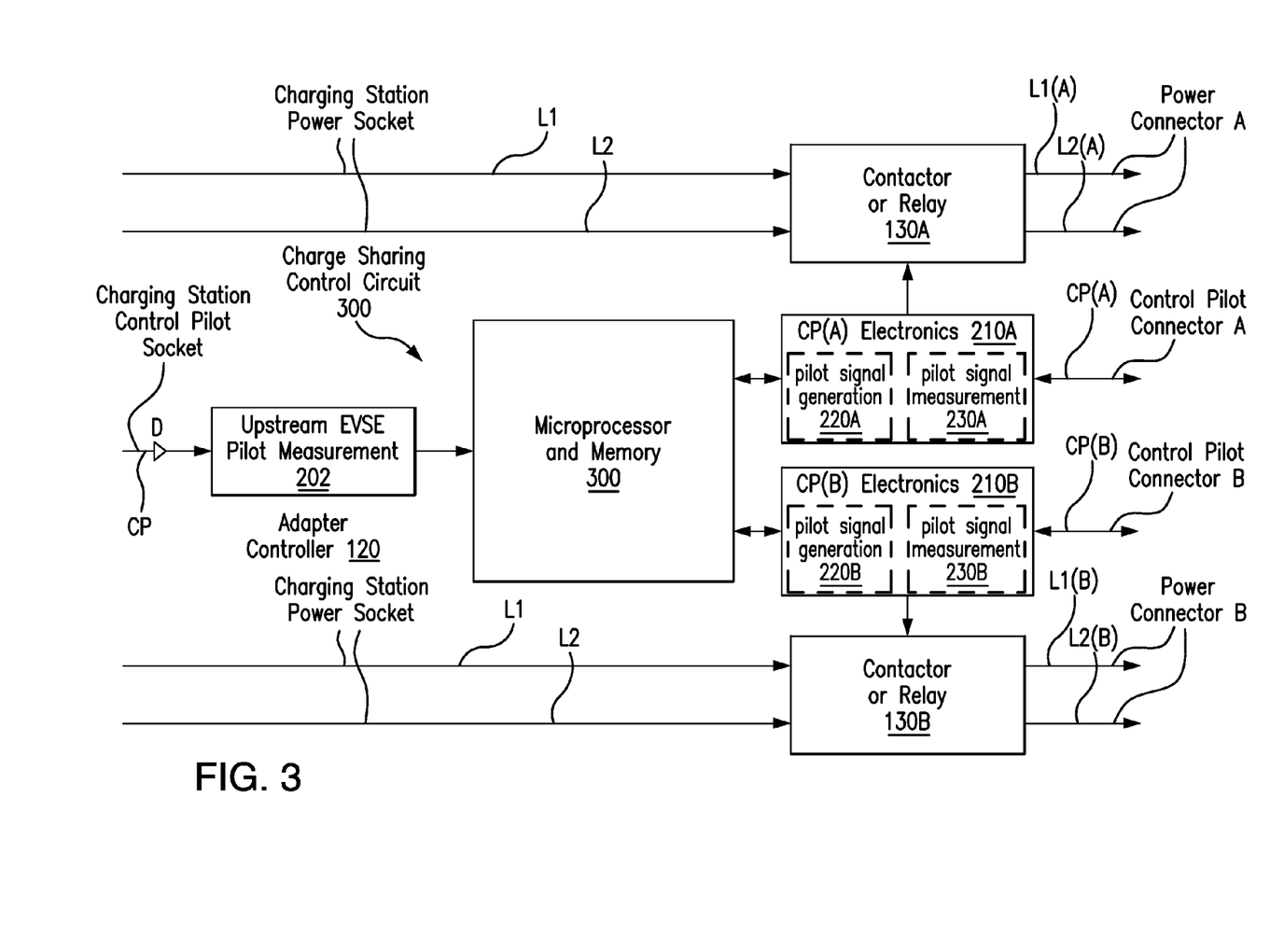
FIG. 3 is a more detailed functional block diagram of the example add-on adapter of FIG. 1, showing a charge sharing control circuit in the adapter controller, coupled to the two pilot signal measurement circuits and to the upstream pilot measurement circuit, to determine modified available charging rates to be offered for simultaneously charging two respective electric vehicles. The figure further shows two contactors having a switch control input coupled to the adapter controller, the two contactors switchably connecting a charging station power socket to the respective electric vehicle charging handles in response to the adapter controller indicating that the respective electric vehicles are ready to be charged.

FIG. 3 is a more detailed functional block diagram of the example add-on adapter of FIG. 1, showing a charge sharing control circuit 300 as a microprocessor and memory containing program code executable by the microprocessor, to carry out the functions described for the add-on adapter 110. The figure shows two contactors 130A and 130B having a switch control inputs respectively coupled to CP(A) electronics 210A and CP(B) electronics 210B in the adapter controller.

Figure 4:
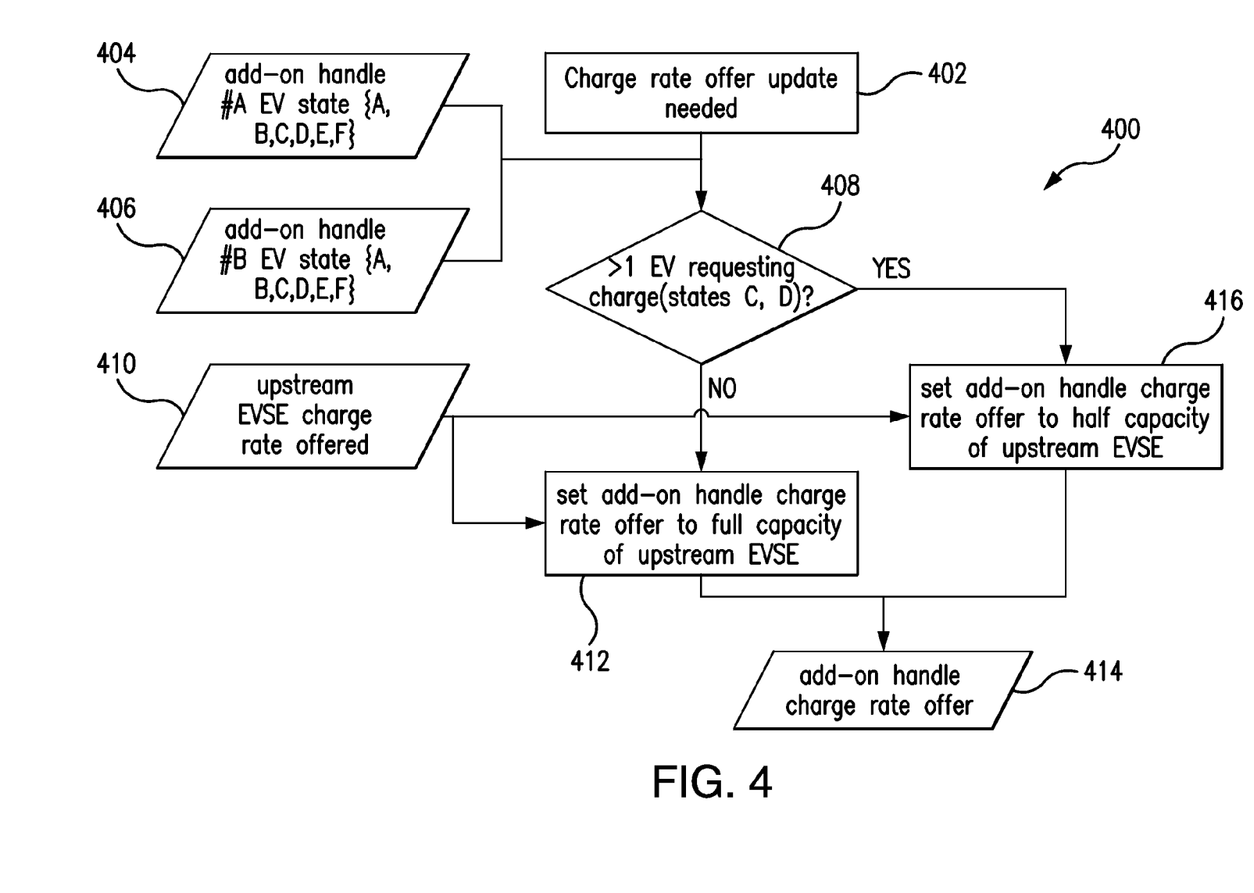
FIG. 4 is a flow diagram of an example process performed by the charge sharing control circuit in the add-on adapter, to dynamically determine that modified available charging rates need to be offered to connected EVs, in response to a change in the maximum charge rate available from the EVSE (or the maximum current as limited by the capacity of the adapter design, whichever is less), without requiring information about the present charging current consumed by the connected EVs.

FIG. 4 is a flow diagram 400 of an example process performed by the charge sharing control circuit 300 in the add-on adapter 120, to dynamically determine whether modified available charging rates need to be offered to connected EVs, in response to a change in the maximum charge rate available from the EVSE. The steps of the flow diagram 400 represent computer code instructions stored in the memory associated with the microprocessor 300, which when executed by the microprocessor 300, carry out the functions of the example embodiments of the invention. The steps may be carried out in another order than shown and individual steps may be combined or separated into component steps. The flow diagram has the following steps:

Step 402 receives an indication from the EVSE that the EVSE has changed its maximum available charge rate. Step 404 indicates the connection state of the first charging handle 150A and Step 406 indicates the connection state of the second charging handle 150B. Step 408 determines whether there is more than one EV connected to a charge handle. Step 410 indicates what the new maximum available charge rate is for the EVSE. If there is only one EV connected, then Step 408 passes to Step 412 that sets the offered charging rate to the full capacity of the upstream EVSE for the connected EV. If there are two EVs connected, then Step 408 passes to Step 416 that dynamically sets the offered charging rate to half capacity of the upstream EVSE for both of the connected EVs. Step 414 makes the charging rate offer to the connected EV or EVs.

When a user plugs a charging handle 150A of one of the add-on adapter's two charging cables A, into an EV's charging inlet, the EV sends a control pilot signal over the control pilot signal line CP(A) to the add-on adapter 110. The control pilot signal indicates that an EV is connected, but is not ready to accept energy. If this is the first EV connecting to the add-on adapter 110, then the add-on adapter is able to offer to the EV, the maximum available current that the EVSE 100 will deliver to the add-on adapter 110. The add-on adapter 110 then signals to the EV over the control pilot signal line CP(A), indicating the amount of the maximum available current. The EV then responds by sending a signal over the control pilot signal line CP(A) to the add-on adapter 110, indicating that the EV is ready to accept energy. The add-on adapter 110 then proceeds to deliver the maximum available current to the EV.

When a user plugs the charging handle 150B of the second cable B of the add-on adapter 110, into a second EV's charging inlet, the second EV sends a signal over the second control pilot signal line CP(B) to the add-on adapter 110. The second control pilot signal indicates that a second EV is connected, but is not ready to accept energy. Since this is the second EV connecting to the add-on adapter 110, the add-on adapter 110 must determine a modified available charging rate to be offered to both the first and the second EVs, since they must share the maximum available current provided by the EVSE.

The add-on adapter includes the charge sharing control circuit 300 that is configured to dynamically determine modified available charging rates to be offered for simultaneously charging two EVs. For example, the charge sharing control circuit 300 in the add-on adapter 110, may dynamically determine that the modified available charging rates to be offered to two respective EVs is half of the available charging rate originally offered by the EVSE 100. The add-on adapter 110 then signals to each EV over its respective control pilot signal line CP(A) and CP(B), indicating the modified available charging rate to be offered to each respective EV. For example, half of the available charging rate offered by the EVSE 100, may be offered to each of the EVs. In this example, half of the maximum available current is offered to each EV.

Each EV then responds by sending a signal over its control pilot signal line CP(A) and CP(B) to the add-on adapter 110, indicating that the EV is ready to accept energy. The add-on adapter 110 then dynamically reduces the charging rate to the first EV, for example, from the maximum available current to half of that value. The add-on adapter 110 then proceeds to deliver half of the maximum available current to the second EV, which is its offered charging rate.

Figure 5:
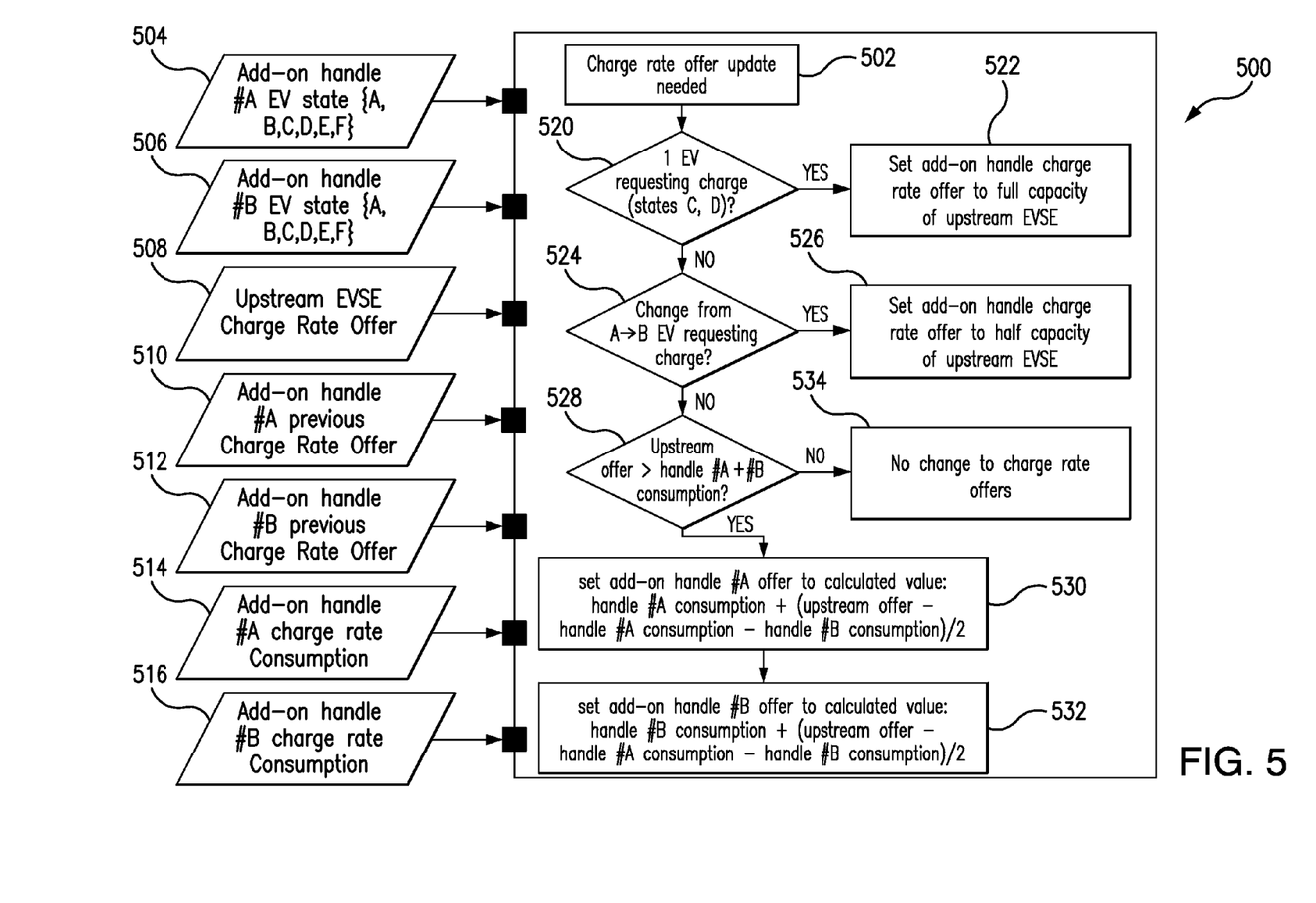
FIG. 5 is a flow diagram of an example process performed by the charge sharing control circuit in the add-on adapter, to optimize utilization of the charging capacity offered by the upstream EVSE by dynamically adjusting the modified charging rates offered to two respective electric vehicles, based on an available charging rate (A) offered by the upstream EVSE, a present charging current (B) for a first of the two electric vehicles, and a present charging current (C) for a second of the two electric vehicles.

FIG. 5 is a flow diagram 500 of an example process performed by the charge sharing control circuit 300 in the add-on adapter 120, to determine revised available charging rates to be offered for sharing power by simultaneously charging two respective electric vehicles, based on an increased available charging rate (A) offered by the charging station, a present charging current (B) for a first of the two electric vehicles, and a present charging current (C) for a second of the two electric vehicles. The steps of the flow diagram 500 represent computer code instructions stored in the memory associated with the microprocessor 300, which when executed by the microprocessor 300, carry out the functions of the example embodiments of the invention. The steps may be carried out in another order than shown and individual steps may be combined or separated into component steps. The flow diagram has the following steps:

Step 502 receives an indication from the EVSE that the EVSE has changed its maximum available charge rate. Step 504 indicates the connection state of the first charging handle 150A and Step 506 indicates the connection state of the second charging handle 150B. Step 508 indicates what the new maximum available charge rate is for the EVSE.

Step 510 indicates the previous charge rate of the first charging handle 150A and Step 512 indicates the previous charge rate of the second charging handle 150B.

Step 514 indicates the charge rate consumption of the first charging handle 150A and Step 516 indicates the charge rate consumption of the second charging handle 150B.

If there is only one EV connected, then Step 520 passes to Step 522 that sets the offered charging rate to the full capacity of the upstream EVSE for the connected EV.

Step 524 determines if there are two EVs connected and no change in the maximum available charge from the EVSE, then Step 526 dynamically sets the offered charging rate to half capacity of the upstream EVSE for both of the connected EVs.

If both the first and the second of the two electric vehicles are connected to respective electric vehicle charging handles and there is a change in the maximum available current from the EVSE, then Step 528 passes to Step 530 and Step 532.

Step 530 dynamically determines for the first of the two electric vehicles, a first increased available charging rate is offered by the adapter controller to the first of the two electric vehicles, equaling $B+(A-B-C)/2$, and Step 532 dynamically determines for the second of the two electric vehicles, a second increased available charging rate is offered by the adapter controller to the second of the two electric vehicles, equaling C+(A−B−C)/2.

Figure 6:
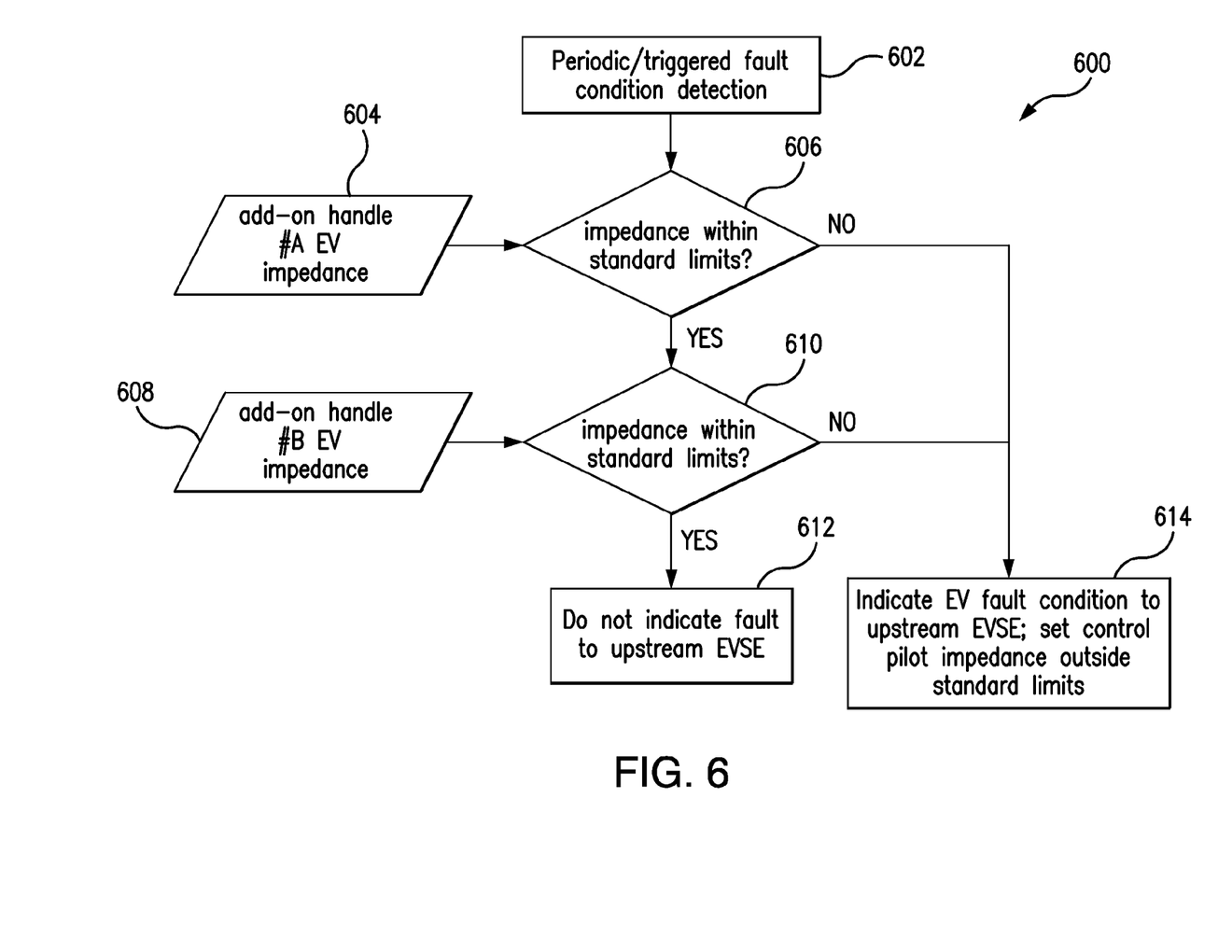
FIG. 6 is a flow diagram of an example process performed by the charge sharing control circuit in the add-on adapter, to test for fault conditions associated with connected electric vehicles, ensuring that electric vehicle control pilot circuits include a required diode, and that impedance to ground is within an acceptable range of values. The example process includes an indication to the upstream EVSE that there is a fault condition on a connected EV circuit by setting the control pilot impedance to a value outside of standard limits, suitable for detection by the upstream EVSE.

FIG. 6 is a flow diagram 600 of an example process performed by the charge sharing control circuit 300 in the add-on adapter 120, to test for fault conditions associated with connected electric vehicles, ensuring that electric vehicle control pilot circuits include a required diode and that impedance to ground is within an acceptable range of values. If such conditions are not met and a fault is detected, the add-on handle control electronics may indicate a fault to the upstream EVSE. This may be desirable to alert the EVSE owner/operator of the problem, and to indicate that the EV is not charging. The steps of the flow diagram 600 represent computer code instructions stored in the memory associated with the microprocessor 300, which when executed by the microprocessor 300, carry out the functions of the example embodiments of the invention. The steps may be carried out in another order than shown and individual steps may be combined or separated into component steps. The flow diagram has the following steps:

Step 602 initiates a periodic fault condition detection. Step 604 measures the impedance of the first charging handle 150A. Step 606 determines if the impedance of handle 150A is within standard limits. If the impedance is not within the limits, then pass to step 614 to indicate the EV fault condition to the upstream EVSE and set the control pilot impedance outside standard limits. If the impedance of handle 150A is within limits then pass to step 610. Step 608 measures the impedance of the second charging handle 150B. Step 610 determines if the impedance of handle 150B is within standard limits. If the impedance is not within the limits, then pass to step 614. If the impedance of handle 150B is within limits, then step 612 does not indicate a fault to the upstream EVSE.

In other example embodiments of the invention, the detection of a fault on either connected EV circuit may potentially interrupt charging on a connected EV that is already charging. If a fault condition is detected on one add-on handle while a connected EV is already charging on a different add-on handle, the add-on adapter may follow a process that delays the indication of the detected fault to the upstream EVSE until the already charging connected EV has stopped requesting charge or is disconnected, while simultaneously preventing charging of the connected EV corresponding to the detected fault.

FIG. 7 is a circuit diagram of the example adapter controller of FIG. 2, including a delay circuit 702 configured to delay requesting power from the EVSE when the add-on adapter 110 is initially connected to the EVSE. Due to constraints of the design of the upstream EVSE, it may be desirable to use an embodiment which delays requesting charge temporarily, when the add-on adapter 110 is connected to the upstream EVSE. FIG. 7 shows an example embodiment of a circuit 702 for the add-on adapter, to delay requesting charge from the upstream EVSE. The specific values of R6, R7, R8, R9, C1, and D2 are not central to the operation of the invention. Values must be chosen to allow a desired delay between connection to the upstream EVSE and turning on transistor T1.

Figure 8:
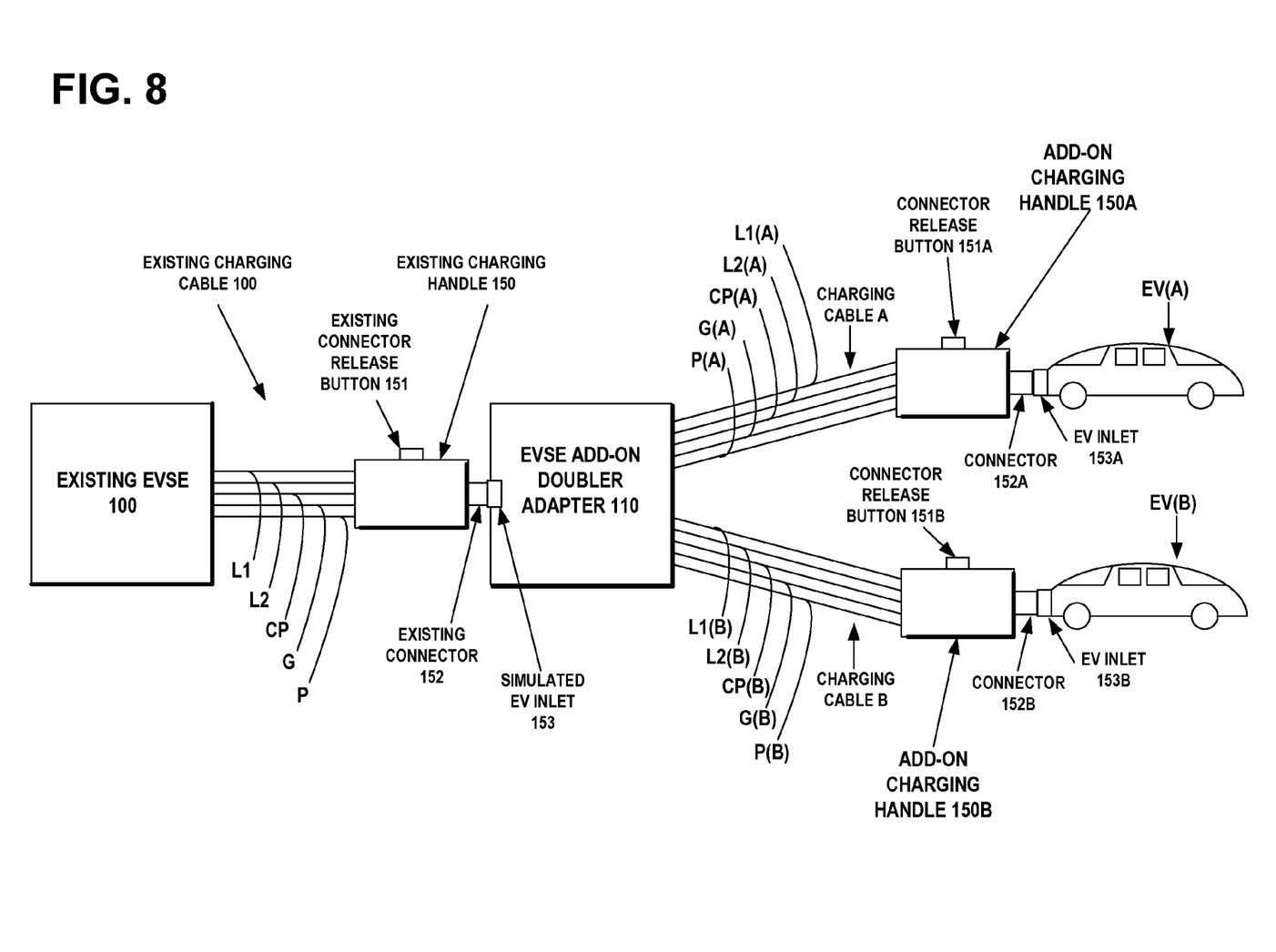
FIG. 8 is a functional block diagram of an alternate example add-on adapter connected to an existing EVSE charging cable and upstream charging handle via a simulated EV inlet in the add-on adapter, which accepts the upstream charging handle. The add-on adapter is electrically connected to two downstream charging handles, for sharing power by simultaneously charging two respective electric vehicles. The add-on adapter monitors for an occurrence of any connector release button press on the upstream charging handle, to interrupt charging of any EVs connected to the downstream charging handles, based on detection of a button press on the upstream charging handle.

FIG. 8 is a functional block diagram of an alternate example add-on adapter 110 connected to an existing EVSE 100 having an existing charging cable 100 and an existing upstream charging handle 150. The upstream charging handle 150 has an existing connector 152 that would normally connect with an EV inlet, such as 153A or 153B for charging the vehicles EV(A) or EV(B). However, the add-on adapter 110 has a simulated EV inlet 153 that accepts the existing connector 152 of the upstream charging handle 151, thereby connecting the add-on adapter 110 to the EVSE 100. The add-on adapter 110 is electrically connected by the charging cables A and B to two downstream charging handles 150A and 150B, respectively, for sharing power by simultaneously charging two respective electric vehicles EV(A) and EV(B).

Conventionally, EV charging handles, such as 150, 150A, and 150B, have a connector 152, 152A, and 152B that is inserted into an EV inlet, for example 153A of vehicle EV(A) or 153B of vehicle EV(B), for charging. When the connector is inserted into the EV inlet, it is latched in place by a connector latch (not shown). The charging handle includes a connector release button, such as 151, 151A, and 151B, that the user may press to release the latch to remove the connector from the EV inlet. Conventionally, if the user pushes the connector release button, which may occur, for example, when unplugging the handle, the EV detects this and quickly stops charging and stops requesting charge from the EVSE. A proximity detection switch (not shown) in the charging handle is normally closed at all times except when the connector release button is pressed to decouple the connector from the vehicle inlet. Opening the proximity detection switch triggers the onboard vehicle charge control to provide a controlled shutoff of charge power prior to disconnection.

In accordance with an embodiment of the invention, the add-on adapter 110 monitors for and detects any occurrence of pressing the existing connector release button 151 on the existing upstream charging handle 150, to interrupt charging of any EVs connected to the downstream charging handles 150A and 150B, based on detection of a button press actuation on the upstream charging handle 150. The add-on adapter performs a check similar to that which an EV would perform. If the connector release button 151 is pushed on the upstream handle 150, the add-on adapter 110 interrupts charging of any downstream EVs based on detection of the proximity button press on the upstream handle 150.

One method to interrupt charging if an upstream button press is detected, is for the add-on adapter 110 to apply current on the proximity detection line P(A) to the downstream charging handle 150A, for example, to make the EV(A) connected to handle 150A stop charging through its normal charging process, by simulating a button press process. If two vehicles were connected to the charging cables A and B, and if the button 151 were pushed on the upstream charging handle 150, the add-on adapter 110 would respond by applying current on both of the proximity detection lines P(A) and P(B) to the respective downstream charging handles 150A and 150B, to make the connected vehicles, EV(A) and EV(B), stop charging through their normal charging process.

Another method to interrupt charging if an upstream button press is detected, is to open the contactor/relay in the add-on adapter 110. A third method is to open the control pilot circuit to the upstream EVSE, to enter state A on the interface to the upstream EVSE.

In an example embodiment of the invention, the add-on adapter 110 may monitor the impedance of the proximity detection line P from the upstream handle 150 before offering charge to the downstream EVs. If the proximity detection line P is within range of the nominal impedance (480 ohms), the add-on adapter 110 may offer charge to any EVs connected to the downstream handles 150A and 150B. If the proximity detection line P is not within range of the nominal impedance, the add-on adapter 110 prevents the control pilot signal to both downstream handles 150A and 150B from going to state C, by not changing from a DC voltage to a pulse width modulation (PWM) output.

In example embodiments of the invention, it may be desirable to include a locking mechanism (manual or automated with a solenoid) to prevent someone from disconnecting the add-on adapter 110. If done with a solenoid, the handle may be locked only when an EV is requesting charge, and the handle may be unlocked when no EV is connected or none are requesting charge.

Although specific example embodiments of the invention have been disclosed, persons of skill in the art will appreciate that changes may be made to the details described for the specific example embodiments, without departing from the spirit and the scope of the invention.

The invention claimed is:

1. An adapter to double available charging handles for an electric vehicle charging station, comprising:
   an adapter controller configured to electrically connect to a charging port of an electric vehicle charging station, the adapter controller being further configured to electrically connect to two electric vehicle charging handles configured to charge two electric vehicles;
   a charge sharing control circuit in the adapter controller, coupled to two electric vehicle control pilot connectors in two electric vehicle charging handles and coupled to a charging station control pilot socket in the charging port of the electric vehicle charging station, the charge sharing control circuit being configured to determine a modified available charging rate to be offered to each of the two electric vehicles, for sharing power by simultaneously charging the two electric vehicles, based on connection states of the two electric vehicles to the electric vehicle charging handles and based on an available charging rate offered by the charging station; and
   the adapter controller being configured to transmit to each of the two electric vehicles, a charging rate offer representing the determined modified available charging rate.

2. The adapter to double available charging handles for an electric vehicle charging station of claim 1, further comprising:
   the adapter controller being further configured to receive an indication from either or both of the electric vehicles, representing a ready state of the electric vehicle as being ready to be charged;
   two contactors having a switch control input coupled to the adapter controller, each contactor configured to switchably connect a charging station power socket in the charging port of the electric vehicle charging station, to power connectors of the electric vehicle charging handles; and
   the adapter controller being further configured to control the two contactors to provide power at the determined modified available charging rate to each of the two electric vehicles, for simultaneous charging.

3. The adapter to double available charging handles for an electric vehicle charging station of claim 1, further comprising:
   the charge sharing control circuit being further configured to determine that the modified available charging rate to be offered to each of the two electric vehicles is half of the available charging rate offered by the charging station.

4. The adapter to double available charging handles for an electric vehicle charging station of claim 1, further comprising:
   the charge sharing control circuit being further configured to receive an indication via the charging station control pilot socket, representing an increased available charging rate (A) offered by the charging station, wherein the increased available charging rate (A) is greater than a sum of a first charging current (B) presently being supplied to the first of the two electric vehicles and a second charging current (C) presently being supplied to the second of the two electric vehicles;
   the charge sharing control circuit being further configured to determine revised available charging rate to be offered for sharing power by simultaneously charging the electric vehicles, based on the increased available charging rate (A) offered by the charging station, the present charging current (B) for a first of the two electric vehicles, and the present charging current (C) for a second of the two electric vehicles;
   wherein, if only the first of the two electric vehicles is connected to an electric vehicle charging handle, then the increased available charging rate (A) is offered by the adapter controller to the first of the two electric vehicles; and
   wherein, if both the first and the second of the two electric vehicles are connected to electric vehicle charging handles, then
      for the first of the two electric vehicles, a first increased available charging rate is offered by the adapter controller to the first of the two electric vehicles, equaling $B+(A-B-C)/2$, and
      for the second of the two electric vehicles, a second increased available charging rate is offered by the adapter controller to the second of the two electric vehicles, equaling $C+(A-B-C)/2$.

5. The adapter to double available charging handles for an electric vehicle charging station of claim 1, wherein the adapter is configured to connect to a standard SAE J1772 charging port accepting power output from an existing installed Electric Vehicle Supply Equipment (EVSE).

6. The adapter to double available charging handles for an electric vehicle charging station of claim 1, further comprising:
   a delay circuit in the adapter controller, the delay circuit being configured to delay requesting power from the charging station when the adapter is initially connected to the charging station.

7. The adapter to double available charging handles for an electric vehicle charging station of claim 1, further comprising:
   the adapter controller being further configured to test for fault conditions associated with connected electric vehicles.

8. The adapter to double available charging handles for an electric vehicle charging station of claim 1, further comprising:
   an upstream pilot measurement circuit in the adapter controller, coupled to the charging station control pilot socket and the charge sharing control circuit, the upstream pilot measurement circuit being configured to receive an indication via the charging station control pilot socket, representing an available charging rate offered by the charging station;

two pilot signal measurement circuits in the adapter controller, each coupled to the two electric vehicle control pilot connectors and the charge sharing control circuit, the two pilot signal measurement circuits being configured to receive an indication via the electric vehicle control pilot connector representing a connection state of the electric vehicle charging handle as whether or not being connected to an electric vehicle;

two pilot signal generation circuits in the adapter controller, each coupled to the two electric vehicle control pilot connectors and to the charge sharing control circuit, the two pilot signal generation circuits being configured to transmit charging rate offer indications representing the determined modified available charging rate to be offered to the electric vehicles for simultaneous charging; and the two pilot signal measurement circuits being further configured to receive an indication representing a ready state of an electric vehicle as being ready to be charged.

9. The adapter to double available charging handles for an electric vehicle charging station of claim 1, further comprising:

wherein the adapter controller is electrically connected to the charging port of the electric vehicle charging station through an existing charging cable and an existing upstream charging handle, the existing upstream charging handle having a connector release button to release the existing upstream charging handle from connection to the adapter controller if the connector release button is actuated;

the adapter controller being configured to detect an occurrence of actuating the connector release button on the existing upstream charging handle, the adapter controller being configured to interrupt charging of an electric vehicle connected to the adapter controller, in response to detection of actuation of the connector release button of the upstream charging handle.

\* \* \* \* \*